Jan. 30, 1973  G. HESS ET AL  3,713,784
REACTION ELEMENT FOR THE CONVERSION OF HYDROCARBONS
Filed Jan. 14, 1970  2 Sheets-Sheet 2

GUNTHER HEβ
GERHARD MARTENS  INVENTORS
& KURT POHL
BY
Molinare, Allegretti, Newitt & Witcoff
Attys.

United States Patent Office 3,713,784
Patented Jan. 30, 1973

3,713,784
REACTION ELEMENT FOR THE CONVERSION
OF HYDROCARBONS
Gunther Hess, Offenbach-Bieber, Gerhard Martens, Offenbach am Main, and Kurt Pohl, Braunfels, Germany, assignors to Vickers-Zimmer Aktiengesellschaft Planung und Bau von Industrieanlagen
Filed Jan. 14, 1970, Ser. No. 2,872
Claims priority, application Germany, Jan. 15, 1969, P 19 01 758.4
Int. Cl. B01j 9/00; B01d 1/00; C10g 1/02
U.S. Cl. 23—288 R
6 Claims

ABSTRACT OF THE DISCLOSURE

A reaction device for the conversion of hydrocarbons which includes an outer housing and an inner sinuous conduit. The housing is closed at one end and has two openings at the other end. The conduit is attached, near one end, to the housing at one of said openings and it terminates near said closed end and communicates with the interior of said housing at that point. Preferably, the device is provided with a thermal expansion compensator located between the housing and the conduit at their points of attachment, and the conduit is provided with a protective jacket.

BACKGROUND OF THE INVENTION

Figure 1:
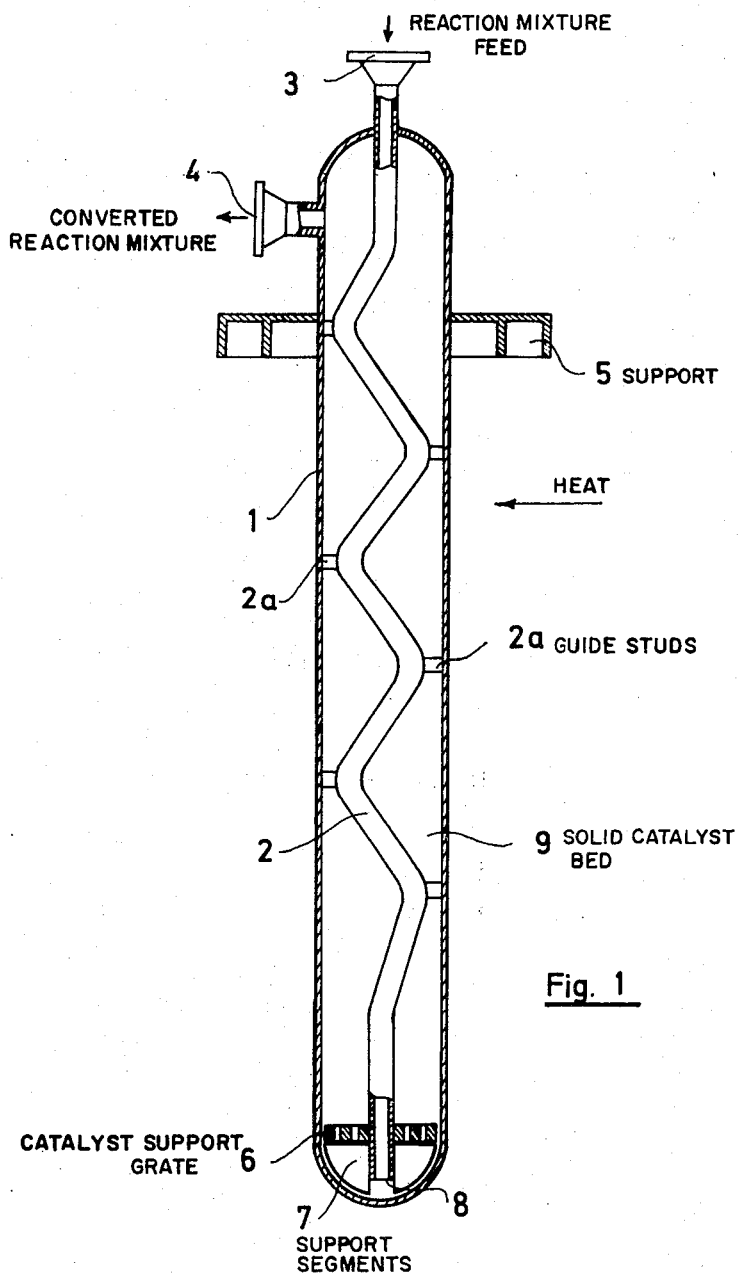

This invention relates to a reaction element for the conversion of hydrocarbons. More particularly, the invention relates to a reaction element or device comprising an outer vessel having therein an inner conduit which has a spiral, wave-like, or helix shape.

In converting or reforming liquid or gaseous hydrocarbons, it is known in the prior art to carry out the conversion with water vapor, and possibly in the presence of air or oxygen, continuously in the so-called tubular furnaces. In order to generate useful gaseous products, for example synthesis or city gases, generally a cubically or cylindrically shaped furnace is used which contains a number of reaction elements. Each of such reaction elements is generally a heat-resistant pipe having diameters ranging from 50 to 200 mm. and a length of about 3 to 8 meters. The continuous conversion of the reaction mixtures, which normally consist of hydrocarbons, steam and/or air and/or oxygen, takes place under predetermined reaction conditions and with the aid of appropriate catalysts located inside the reaction element. The reaction elements, charged with catalysts, are most commonly heated directly to supply the large amount of heat absorbed by the generally endothermic reaction. The reaction is also generally carried out at high temperatures, of the order of about 1000° C., although the specific temperature employed would depend on the particular reaction mixture being processed. At such high temperatures, very great material stresses are placed on the conventional tubular furnaces.

Prior art attempts to counteract the great material stresses in such furnaces has been by way of different designs for the reaction elements. In addition to the simple design of straight pipes through the furnaces, other known designs include U-pipe or double pipe form, the so-called Field pipes. Reaction elements with inner pipes surrounded by an outer member are particularly vulnerable to the deformation caused by the high temperature in the hearth area. This is due to the differential deformation, or different amounts of thermal expansion, between the internal tubes or other structures on the one hand and the outer pipe or container on the other hand. Damage or destruction of the reaction element can be easily caused by such differential deformation. In addition, the differences in various thermal properties, such as expansion and strength, of the catalysts located between the outer housing or container and the inner structural members also increase the likelihood of damage to the reaction elements.

The problem is further accentuated by the fact that the reaction elements are frequently exposed to large changes in temperatures. In the prior art, such difficulties are generally countered by an attempt to operate the reaction elements under as nearly as possible constant temperatures and to carry out the warm-up and cooling steps very slowly. However, such a mode of operation is uneconomical as well as being impractical. Municipal gas companies typically will give favorable rates to users whose requirements may be fluctuated to compensate for peak loads caused by residential users during various times of the day. In addition, the shut down of an installation for unexpected repairs or maintenance is not easily subject to control to minimize the temperature changes.

It is, accordingly, an object of the present invention to provide a novel reaction element for the conversion of hydrocarbons.

It is another object of the present invention to provide a reaction element for the conversion of hydrocarbon which is conducive to economical operation of the conversion reaction.

It is a further object of the present invention to provide a reaction element for the conversion of hydrocarbons which can withstand sudden temperature changes.

The above and other objects of the invention can be gathered from a reading of the following description.

SUMMARY OF THE INVENTION

In accordance with the present invention, a reaction device for the conversion of hydrocarbons is provided which comprises an outer pipe or housing closed at its lower end and having two openings at the other end thereof; a sinuous inner pipe or conduit positioned longitudinally within said housing having one end attached to said housing at one of the openings thereof while the other end of said conduit communicates with the inside of said housing near the closed end. Preferably, the reaction device or element of the invention also includes a thermal expansion compensator located between said housing and said conduit. When such a compensator is employed, the conduit is attached to the housing through the compensator. The reaction element according to the present invention permits operation with extreme temperature changes and intermittent mode of operation of the entire reactor system.

BRIEF DESCRIPTION OF THE DRAWINGS AND OF THE PREFERRED EMBODIMENTS

As indicated above, the present invention provides a reaction element for the conversion of hydrocarbons which comprises an outer housing and a sinuous inner conduit. The construction according to the invention permits the shutting down of a furnace equipped with such reaction elements within a relatively short period of time, without the need of having to maintaining it at a minimum temperature through the conventional heat-holding operation. The shape of the inner conduit or pipe provides an increase in the heat exchange surface while reducing the length of the reaction element. The diameter of the reaction pipe is also permitted to assume an optimal dimension. This results in savings in expensive and highly alloyed materials. In addition, the furnace itself can be reduced in size, thus making possible the use of materials more favorable in price. The differential heat expansion between inner and outer pipes and the friction between the catalyst and the pipes are reduced to a permissible level.

As also indicated above, the effects of the differential thermal expansion between the inner and outer pipes may be further neutralized by the use of a compensator at the point of attachment between the inner and outer members. Such a compensator will be able to absorb substantially all of the differential thermal expansion so that no stress due to the same is present in the reaction elements of the invention. In this manner, the reaction elements of the invention may be operated with repeated temperature fluctuations without harm.

According to a further embodiment of the invention, a protective jacket or pipe is provided for the sinuous inner conduit. Such a protective jacket may conveniently take the form of a pipe of suitable diameter to surround the entire length of the inner conduit. In this manner, the catalyst charged into the housing will be separated from the inner conduit. Thus, the protective jacket prevents any direct contact and consequent damage to the inner conduit fed into the housing.

Figure 2:
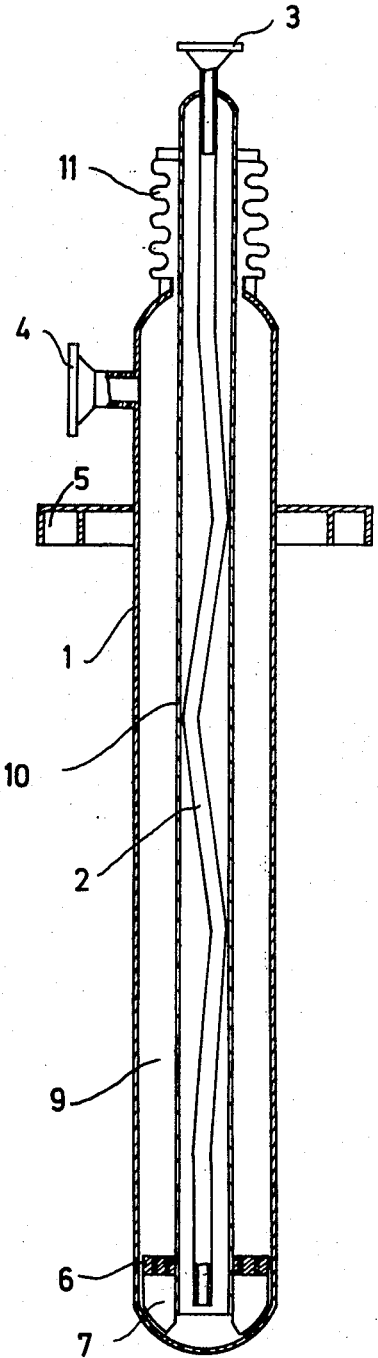

The invention will now be further described with reference to the drawings, in which the same numerals are used to refer to the same parts:

FIG. 1 is a schematic sectional view of a reaction element according to the invention; and FIG. 2 is a schematic sectional view of another embodiment of the reaction element of the invention.

Referring to FIG. 1, the reaction element comprises an outer housing or tube 1 which is closed at its lower end and having two openings at its upper end. An inner conduit or tube 2 bent sinuously or spirally over its entire length is attached to the housing at one of the openings at the upper end of the housing. The spiral or helical inner conduit 2 is suitably provided with guide studs 2a at regular intervals. A feed mixture inlet 3 is attached to the inner conduit 2 at a point outside said housing and the reaction mixture enters the reaction element through said inlet 3. The other end of said inner conduit 2 terminates in an opening 8 near the lower end of said housing. A discharging outlet 4 is connected to the other opening at the upper end of said housing. The converted reaction mixture is discharged via outlet 4 for further processing. It is also possible to reverse the direction of flow of the reaction mixture when using the reaction element of the invention.

A support means 5 is attached to the exterior of said housing in the upper portions of said housing. Said support means permits the suspension of the reaction element in the furnace with a counterpiece (not shown) and fastened to the heat treatment furnace. The support means 5 is provided with a guide for sealing material.

Support segments 7 are provided at the lower end of said housing to support catalyst grate 6. Grate 6 must be capable of supporting a bed of solid catalysts thereon while permitting the passage of fluid reaction mixture therethrough. For example, a catalyst grate 6 may be made of several rings with suitable openings between the rings to permit the passage of a reaction mixture. The lower end of the inner conduit is then supported by connecting it with the catalyst grate 6 and support segments 7. When in operation, the proper catalyst is typically charged into the reaction element to occupy the annular space 9 between the outer housing and the inner conduit.

FIG. 2 shows another embodiment of the reaction element in accordance with the present invention. In FIG. 2, the reaction element is again shown with an outer housing 1, a feed inlet 3, a discharge means 4, support means 5, catalyst grate 6, support segments 7, and the inner conduit 2. In this embodiment, the inner conduit 2 is surrounded over its entire length by a protective jacket or tube 10. The protective jacket 10 is of such a diameter that the sinuous inner conduit 2 fits snugly therein. Such a fit prevents movement of the inner conduit within the protective jacket. The protective jacket 10 is connected to the upper end of the housing via a corrugated compensator 11. The compensator 11 simultaneously serves as the attaching means between the protective jacket 10 and the housing 1, and as a seal thereinbetween. It can be seen that in this embodiment the catalyst, which occupies the annular space 9 within the housing, is prevented from coming into direct contact with inner conduit 2.

The invention has been described in detail with reference to particular and preferred embodiments thereof, but it will be understood that variations and modifications can be effected within the spirit and scope of the invention as described hereinabove and as defined in the appended claims.

We claim:

1. A reformer reactor containing a fixed catalyst bed for the catalytic reaction conversion of hydrocarbons at high temperatures on the order of 1000° C. which comprises:
   (a) an elongated external housing adapted for suspension in a furnace closed at the lower end and having a first opening and a second opening at the other end;
   (b) an outlet for discharge of the products of said reaction disposed in communication with said first opening;
   (c) a generally vertical sinuous conduit positioned axially within said housing, one end of said conduit being attached to said housing at said second opening and the other end of said conduit terminates spaced from said closed end and communicates with the interior of said housing thereat;
   (d) said sinuous conduit and said housing forming an inner and an outer chamber connected in series;
   (e) a feedstock inlet disposed in communication with said sinuous conduit adjacent said attachment of said sinuous conduit with said housing;
   (f) means to support said bed of solid catalytic material upon said support means and around said conduit, which support means is adapted to permit the passage of gases therethrough and to receive said sinuous conduit, said support means is disposed in said outer chamber of said housing and is positioned above and spaced from the terminus of said conduit in an orientation transverse to said conduit axis;
thereby to maintain reaction catalyst spaced from the terminus of said conduit while providing for chambers connected in series for sequential counter-current passage of gases through said tube and bed and which sinuous conduit in said reformer reactor is capable of compensating for differential deformation due to thermal stresses of large and sudden temperature changes.

2. A reaction device according to claim 1 further comprising a protective jacket for said conduit, said protective jacket surrounding said conduit but permitting communication between the conduit and said housing near said closed end.

3. A reaction device according to claim 1 further comprising a compensator for thermal expansion, and means for attaching said conduit to said housing through said compensator.

4. A reaction device according to claim 1 wherein said sinuous conduit is in the shape of a helix or spiral.

5. A reaction device according to claim 1 wherein said sinuous conduit is in the shape of a planar undulating curve.

6. A reaction device according to claim 1 further comprising a protective jacket for said conduit and a compensator for thermal expansion, said protective jacket surrounding said conduit but permitting communication between the conduit and said housing near said closed end, and said conduit being attached to said housing through said jacket and compensator.

References Cited

UNITED STATES PATENTS

| | | | |
|---|---|---|---|
| 2,276,307 | 3/1942 | Houdry | 23—288 L X |
| 2,579,843 | 12/1951 | Mader | 23—288 M X |
| 3,223,081 | 12/1965 | Hunt | 23—288 R X |
| 3,607,125 | 12/1968 | Kydd | 23—288 R |
| 99,998 | 2/1870 | Stevens | 122—318 |
| 202,917 | 4/1878 | Atkinson | 165—142 |
| 665,912 | 1/1901 | Jolicard | 165—142 X |
| 1,818,082 | 8/1931 | Mott | 165—142 X |
| 1,873,637 | 8/1932 | Emmet | 122—318 |
| 2,010,698 | 8/1935 | Newkirk | 122—318 X |
| 3,201,938 | 8/1965 | Zirin | 165—142 X |
| 3,305,600 | 2/1967 | Hopper et al. | 165—142 X |
| 3,368,546 | 2/1968 | Wade | 165—142 X |
| 3,605,872 | 9/1971 | Brault | 165—1 |

FOREIGN PATENTS 21,803    1902    Great Britain    165—155

NORMAN YUDKOFF, Primary Examiner

J. SOFER, Assistant Examiner

U.S. Cl. X.R.

23—288 M, 288 L; 196—110; 159—DIGEST 3; 165—81